March 6, 1928. 1,661,469
F. P. FERRIS
AUXILIARY TRANSMISSION
Filed July 23, 1925 2 Sheets-Sheet 1
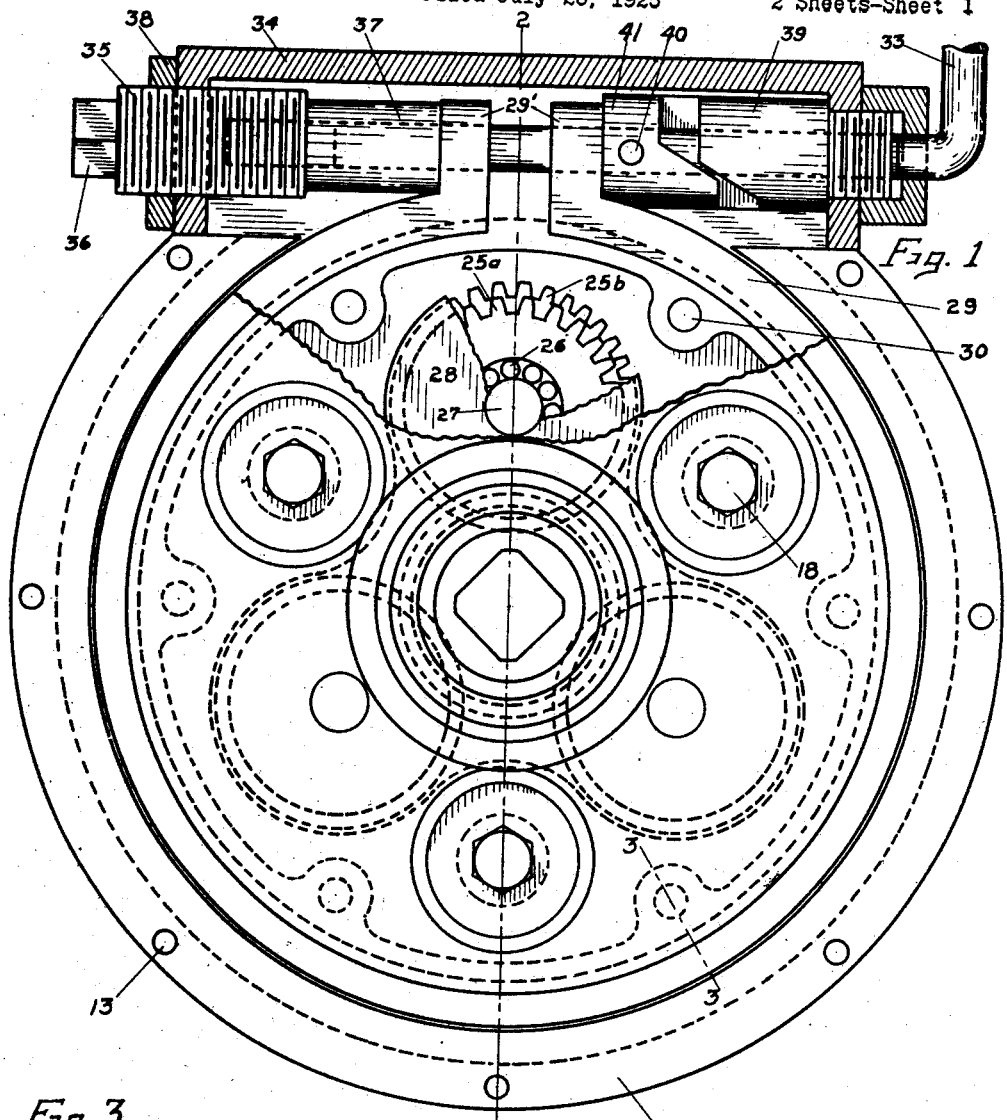
Fig. 1
Fig. 3.
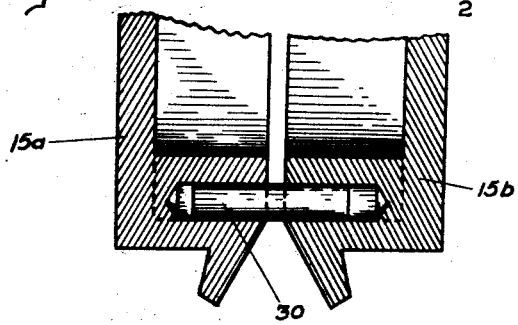
F. P. FERRIS. INVENTOR.
BY Emil F. Lange
ATTORNEY.

March 6, 1928.
F. P. FERRIS
1,661,469
AUXILIARY TRANSMISSION
Filed July 23, 1925
2 Sheets-Sheet 2
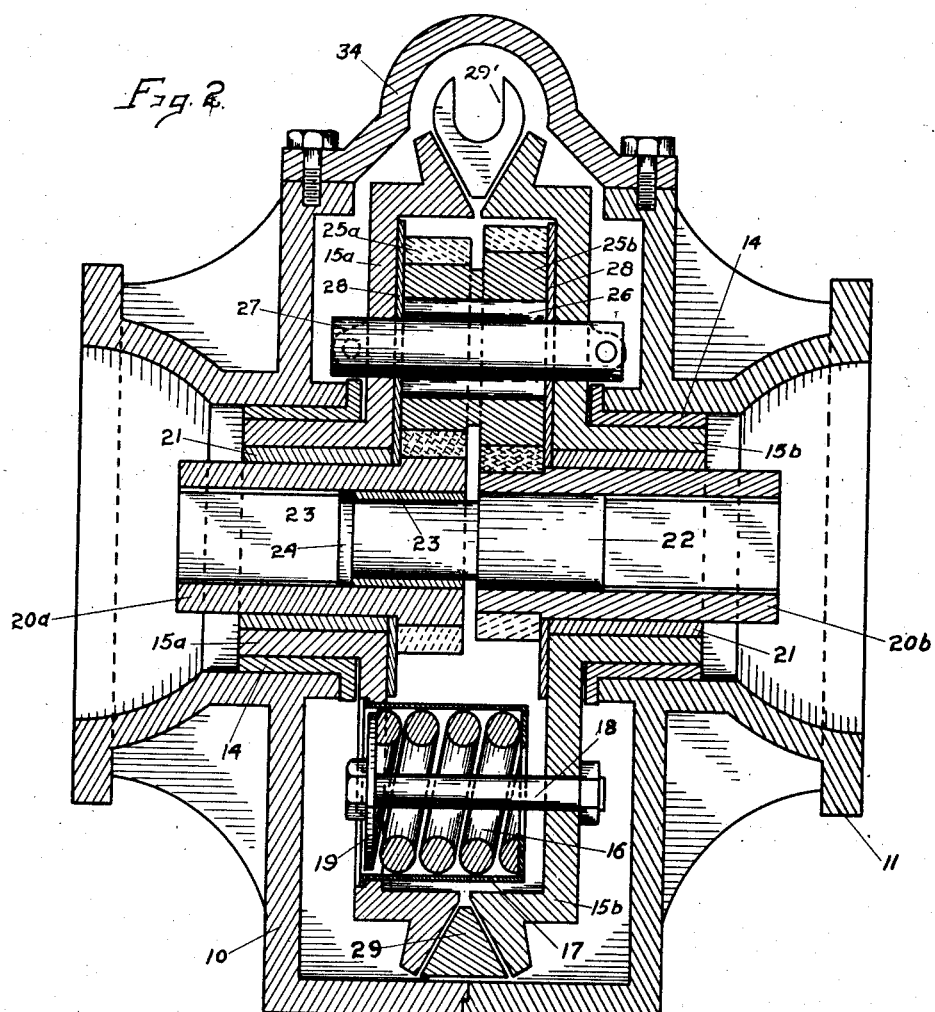
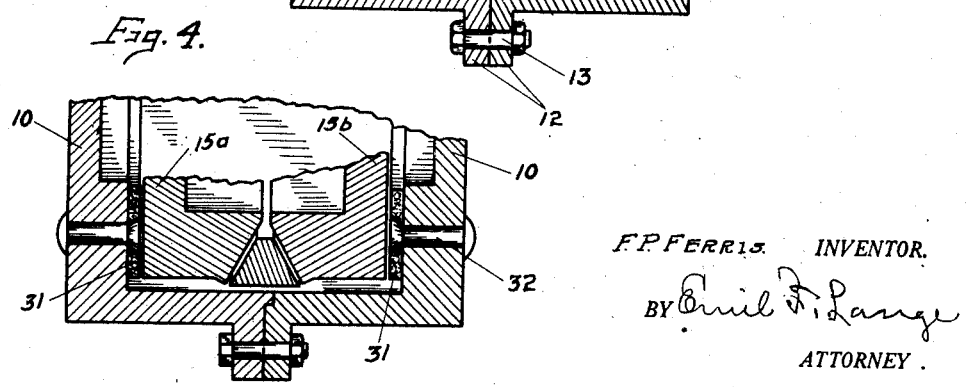
F. P. FERRIS, INVENTOR.
BY Emil F. Lange
ATTORNEY.

Patented Mar. 6, 1928.

1,661,469

UNITED STATES PATENT OFFICE.

FRANK P. FERRIS, OF LINCOLN, NEBRASKA.

AUXILIARY TRANSMISSION.

Application filed July 23, 1925. Serial No. 45,633.

The invention set forth in this application relates to a change speed gearing which is designed primarily for use as an attachment to the transmission gear of automobiles, its objects including the provision of a device which is simple in construction and whereby the number of gear speeds may be doubled or otherwise multiplied, and whereby the life of the motor and electrical system may be conserved.

Having in view these objects and others which will be referred to in the following description, I will now refer to the drawings, in which Figure 1 is an end elevation of the device with parts removed to disclose interior constructions, other parts being broken away, and still other parts being shown in section.

Figure 2 is a sectional view on line 2—2 of Figure 1.

Figure 3 is a sectional view on line 3—3 of Figure 1.

Figure 4 is a sectional view showing the use of clutch facing which may be employed in my device by way of a slight modification.

The housing is formed of two castings 10 and 11 which differ from each other only in their interfitting male and female connections. Each casting is provided with a peripheral flange 12 with shoulders and grooves as shown in Figure 2 and with apertures for the reception of bolts 13 for securing the castings together. Both castings have shouldered interior cylindrical walls for seating the flanged bushings 14 in which the sleeve portions $15^a$ and $15^b$ of the inner or planetary housing are slidably and rotatably mounted.

The inner or planetary housing is made up of two parts $15^a$ and $15^b$ which are identical except for one slight difference which will be noted later in the description. Both parts have a slight sliding relation in the bushings 14, and they are rotatable with respect to the bushings but may be held to prevent rotation. The two parts are normally held together by compression springs 16. The number of compression springs may be varied as desired, but it is preferable to provide three so as to equally distribute the action of the springs. Each clutch spring 16 is seated in a spring box 17 surrounding a bolt 18. The spring box 17 has an annular flange which is seated in an annular groove in the outer surface of the part $15^a$ of the planetary housing. The spring 16 bears against the rear wall of the spring box 17 and against a washer 19 which abuts against the head of the bolt 18. It will thus be seen that the compression spring 16 urges the parts $15^a$ and $15^b$ toward each other and normally holds them in juxtaposition.

The gears $20^a$ and $20^b$ are rotatably secured within the collar portions of the inner or planetary housing 15, being separated therefrom by bushings 21. One of these gears has a larger gear diameter than the other, the gear $20^a$ being the larger in the present instance. The two gears $20^a$ and $20^b$ are mounted for independent rotation but they are held in coaxial alignment by a pilot plug 22, which is rotatably mounted in a bushing 23 within the gear $20^a$. Any desired means may be employed for spacing the gears $20^a$ and $20^b$ to prevent interference between them. By way of illustration I show a thrust disc 24 anchored within the gear $20^a$ and abutting against the end of the pilot plug 22.

Meshing with the gears $20^a$ and $20^b$ are the differential cluster gears having gear faces $25^a$ and $25^b$ of unequal diameters. The differential cluster gears rotate on roller bearings 26 or other frictionless bearings about the counter shaft 27 which is secured in the walls of the inner or planetary housing 15. In number I prefer to provide three equidistantly spaced cluster gears as shown in Figure 1, these gears alternating with the springs 16. The spaces between the cluster gears and the inner walls of the inner or differential housing are occupied by the friction plates 28 which have the form shown in dotted outline in Figure 1. The purpose and function of these friction plates will be set forth in connection with the description of the operation of the gear change.

At their outer peripheries the parts $15^a$ and $15^b$ are bevelled on their inner edges so that together they form a seat, which is V-shaped in section, for the gear changing ring 29. This ring when loose is normally out of frictional contact with the inner or planetary housing 15. The springs 16 urge the two parts of the planetary housing toward each other and into frictional engagement with the cluster gears through the friction plates 28. It will thus be evident that when the ring 29 is loose, the inner or planetary housing will rotate as a unit about its central axis and that it will carry with it the cluster gears. If the drive is applied through either the gear 20ª or the gear 20ᵇ, then the other gear will be rotated at the same speed. If, however, the ring 29 is tightened, the ring will frictionally engage both parts of the inner or planetary housing and will also cause them to spread against the action of the springs 16, at the same time releasing the cluster gears 25 from frictional engagement with the friction plates 28. In other words, the tightening of the ring tends to bind the two parts of the inner or planetary housing to prevent their rotation and at the same time it releases the cluster gears so that they are free to rotate about their axes. In addition, the two parts of the planetary housing 15 are forced into frictional engagement with the annular disc portions of the bushings 14.

The drive may be applied to either the gear 20ª or to the gear 20ᵇ, and when the parts of the inner or planetary housing are spread as above described the power will be delivered at a greater or less speed of rotation according to which of the two gears is the drive gear. For example, if the drive is applied to the gear 20ª and the planetary housing is held against rotation, the motion of the gear 20ª will be communicated to the gear 25ª and transmitted through the gear 25ᵇ to the gear 20ᵇ. When the drive is thus applied to the gear 20ª, the gear 20ᵇ will be caused to rotate at a speed higher than that of the gear 20ª. Likewise, if it is desired to step down the gearing, it is only necessary to apply the drive to the gear 20ᵇ so that the gear 20ª will be driven at a lower speed than that of the gear 20ᵇ. It should be noted that the entire device is symmetrical and that it may be turned end to end without disturbing the shafting.

In order to prevent any possible disturbance of the relative positions of the two parts of the inner or planetary housing 15, dowel pins 30 are loosely set in aligning sockets in the parts 15ª and 15ᵇ as shown in Figure 3, or they may be secured rigidly to one of the parts to slide loosely in sockets in the other part. The pilot plug 22 of course prevents any bodily displacement of the two parts of the planetary housing relative to each other but it does not prevent unequal rotation of the two parts about their axis. The dowel pins prevent such unequal rotation without at the same time interfering with the operation of the gearing or the change speed mechanism. The dowel pins act in the same capacity for the planetary housing as the pilot plug acts for the gear assembly.

In Figure 4 is shown a slight modification for increasing the friction for the gear change. In some cases the friction of the ring combined with that of the bushings 14 may not be sufficient to hold the planetary housing against rotation, but the construction is such that additional friction for this purpose may readily be provided. Simply by way of illustration and as showing one type of structure which may be employed for this purpose, there is shown in Figure 4 the application of friction clutch facing 31 to the inner walls of the outer housing 10. The clutch facing may simply rest against the inner walls or it may be secured to the walls by means of rivets 32 or by any other suitable fastening devices. When the parts 15ª and 15ᵇ are then spread, their outer walls will come into contact with the clutch facing to still further hold the two parts against rotation.

The device for tightening the gear change ring 29 is shown in Figure 1. As shown, the ring 29 terminates in a pair of spaced ears 29′ which are substantially parallel to each other, the ears having slotted apertures as shown in Figure 2 for receiving the shaft portion of the gear change lever 33. The elongated cap 34 when in use is held secured to the outer housing parts 10 and 11 by any suitable means such as bolts or screws. At one end it is provided with a screw threaded aperture for receiving the plug 35. The plug 35 has a bolt head on its outer end and a socket member 37 on its inner end, the socket member abutting against one of the ears 29′. The plug 35 may be adjusted by applying a wrench to the bolt head 36, and it is held in adjusted position by means of the lock nut 38. The opposite end portion of the cap 34 also has a screw threaded aperture for receiving the screw threaded end of the shaft support 39 in fixed relation to the cap. Fixed to the shaft of the gear change lever 33, as with a pin 40, is the member 41 which bears against the other of the ears 29′. The shaft support 39 and the member 41 are each notched on their sides facing each other, but the shaft support 39 is held in fixed position against rotation while the member 41 is secured to the shaft portion of the gear change lever 33 to rotate therewith. The movement of the gear change lever 33 in one direction thus causes the parts 39 and 41 to spread apart and consequently to cause the ears 29′ to approach each other. The tightening of the ring 29 in this manner results in a wedging action between the parts 15ª and 15ᵇ of the inner or planetary housing and causes them to spread. The notches of the parts 39 and 41 have flat faces so that they will not be disengaged when in either position except by the actuation of the lever 33.

The special design of transmission herein described is designed and adapted particularly for use on any Model T Ford automobile or on any Ford truck, but the same step-up or step-down principle may be applied to any gear shift car. Since the planetary principle is involved in the design, there is no neutral. The gears are always in mesh and the speed changes do not require that the gears be thrown into or out of mesh. When the transmission is not changing the speed ratio, the three cluster gears are held in stationary position by the tension obtained from the three springs which hold the two parts of the inner or planetary housing together, and since the cluster gears are held in a stationary position by the clutch action engagement, the two main gears turn at the same speed as does the inner housing, or in other words, the speed of rotation of the entire mechanism coincides and varies with the speed of the motor.

It might be thought that the friction caused by the tension of the three springs would be inadequate to transmit the power of the motor. It will be noted however, that each of the three cluster gears must rotate twice during one revolution of the drive gear. In other words, it is only necessary to overcome the differential in order to render the clutch engagement positive.

When the power is being transmitted through the counter shafts, the engagement is also due directly to the clutch principle. The gear changing band is contracted by the operation of the lever control and this in turn releases the differential cluster gears to permit them to rotate and simultaneously subjects the inner or planetary housing to sufficient friction to hold it against rotation. If, however, under extreme conditions, this friction is insufficient to prevent the rotation of the inner or planetary housing, the band may be tightened by adjustment so as to spread the two parts of the inner or planetary housing sufficiently to cause them to frictionally engage the flanges of their supporting bushings.

In applying the gear change device to a Ford automobile or truck, it may be installed in either a front or a rear position on the drive shaft, and with either end toward the motor. Regardless of the position or direction of its application, it gives the Ford four speeds forward and two speeds reverse. The installation does not in any way change the operation of the Ford as the usual Ford speeds are controlled exactly as before, regardless of the position of the auxiliary transmission. By the application of the transmission in a step-up position, it is possible to drive the Ford at a much greater speed without abusing the motor at greatly reduced wear and tear on the motor, at the same time effecting a material economy in gasoline and oil consumption. When using this over-power, the driver is not compelled to travel at an excessive rate of speed but he is enabled to drive the car economically whenever driving conditions are such that he can use the over-gear, which under average driving conditions is fully 75% of the time.

If the transmission is installed in the step-down position it enables the driver of the Ford to travel over unusually hilly country, or it is possible to use the higher rear end ratio with this installation and still have plenty of power when it is needed.

Having thus described my invention in such clear and exact terms as will enable others skilled in the art to which it pertains to make and use the same, what I claim as new and desire to secure by Letters Patent of the United States is:—

1. In combination, a pair of gears having their axes in alignment, a housing, planetary gears meshing with said first named gears and journalled in said housing, a spring for normally urging said housing toward and into frictional contact with the sides of said planetary gears for preventing the rotation of said planetary gears about their axes, and manually operable means for moving said housing out of frictional contact with the sides of said planetary gears.

2. In combination, a housing comprising two parts, a pair of gears centrally positioned in said housing and having their axes in alignment, planetary gears eccentrically positioned in said housing and meshing with said first named gears, means for drawing the two parts of the housing together and into frictional engagement with said planetary gears to prevent the rotation of said planetary gears about their axis, and manually operable means for spreading the two parts of said housing, said manually operable means preventing the rotation of said housing but permitting the rotation of said planetary gears.

3. In combination, a pair of gears and a housing, said gears having their axes in alignment and being journalled in said housing, said housing consisting of two complementary parts which are normally urged toward each other, means for preventing the rotation of said two parts relative to each other, planetary gears meshing with said first named gears and journalled in said housing, the two parts of said housing being normally in frictional contact with said planetary gears, and manually operable means for releasing the two parts of said housing from frictional contact with said planetary gears.

In witness whereof I affix my signature.

FRANK P. FERRIS.